(12) United States Patent
Weijun et al.

(10) Patent No.: US 7,966,516 B2
(45) Date of Patent: Jun. 21, 2011

(54) AUTOMATIC JTA MIGRATION

(75) Inventors: Tian Wilson Weijun, Beijing (CN); Alexander J. Somogyi, Basking Ridge, NJ (US); Priscilla C. Fung, Union City, CA (US); Ian Luo, Beijing (CN); Xiang De Liu, Beijing (CN)

(73) Assignee: Oracle International Corporation, Redwood Shores, CA (US)

( * ) Notice: Subject to any disclaimer, the term of this patent is extended or adjusted under 35 U.S.C. 154(b) by 330 days.

(21) Appl. No.: 12/051,587

(22) Filed: Mar. 19, 2008

(65) Prior Publication Data
US 2008/0270487 A1  Oct. 30, 2008

Related U.S. Application Data

(60) Provisional application No. 60/914,636, filed on Apr. 27, 2007.

(51) Int. Cl.
*G06F 11/00* (2006.01)

(52) U.S. Cl. .......................................................... 714/4.1
(58) Field of Classification Search ................... 714/4–6
See application file for complete search history.

(56) References Cited

U.S. PATENT DOCUMENTS

| | | | | |
|---|---|---|---|---|
| 5,835,703 A | * | 11/1998 | Konno | 714/42 |
| 5,914,967 A | * | 6/1999 | Yomtoubian | 714/718 |
| 6,249,887 B1 | * | 6/2001 | Gray et al. | 714/47 |
| 6,493,656 B1 | * | 12/2002 | Houston et al. | 702/187 |
| 2002/0053046 A1 | * | 5/2002 | Gray et al. | 714/42 |
| 2003/0163755 A1 | * | 8/2003 | Fung et al. | 714/4 |
| 2004/0153689 A1 | * | 8/2004 | Assaf | 714/1 |

* cited by examiner

*Primary Examiner* — Bryce P Bonzo
(74) *Attorney, Agent, or Firm* — Fliesler Meyer LLP

(57) ABSTRACT

The failure of a first application server instance of a cluster can be detected and transaction recovery service can be automatically migrated from the first application server instance to a second application server instance without requiring rebooting the first application server instance.

24 Claims, 7 Drawing Sheets

FIG. 5

AUTOMATIC JTA MIGRATION

CLAIM OF PRIORITY

This application claims priority to U.S. Provisional Application No. 60/914,636 entitled "AUTOMATIC JTA MIGRATION", filed Mar. 27, 2007, by Wilson Tian et al., which is herein incorporated by reference.

BACKGROUND

The Java Transaction API (JTA) is a Java API that allows distributed transactions to be done across multiple XA resources. JTA is a specification developed under the Java Community Process as JSR 907. JTA provides for demarcation of transaction boundaries; X/Open XA API allowing resources to participate in transactions.

In the X/Open XA architecture, a transaction manager or transaction processing monitor (TP monitor) can coordinate the transactions across multiple resources such as a database. Each resource has its own manager. The resource manager typically has its own API for manipulating the resource, for example the JDBC API used by relational databases. In addition, the resource manager allows a TP monitor to coordinate a distributed transaction between it and other resource managers. Finally, there is the application which communicates with the TP monitor to begin, commit or rollback the transactions. The application also communicates with the individual resources using their own API to modify the resource.

Application servers can maintain these transactions for JTA or other transaction processing systems using Transaction Recovery Services (TRS). The transaction recovery service can maintain a Transaction Log (TLOG) to allow the application server to recover from a crash that affects or flight transactions.

The application server can be part of a cluster. In past systems, when the application server goes down, the TRS can be manually migrated to another application server instance or the system can wait until the crashed application server instance reboots.

DESCRIPTION OF THE FIGURES

Figure 5:
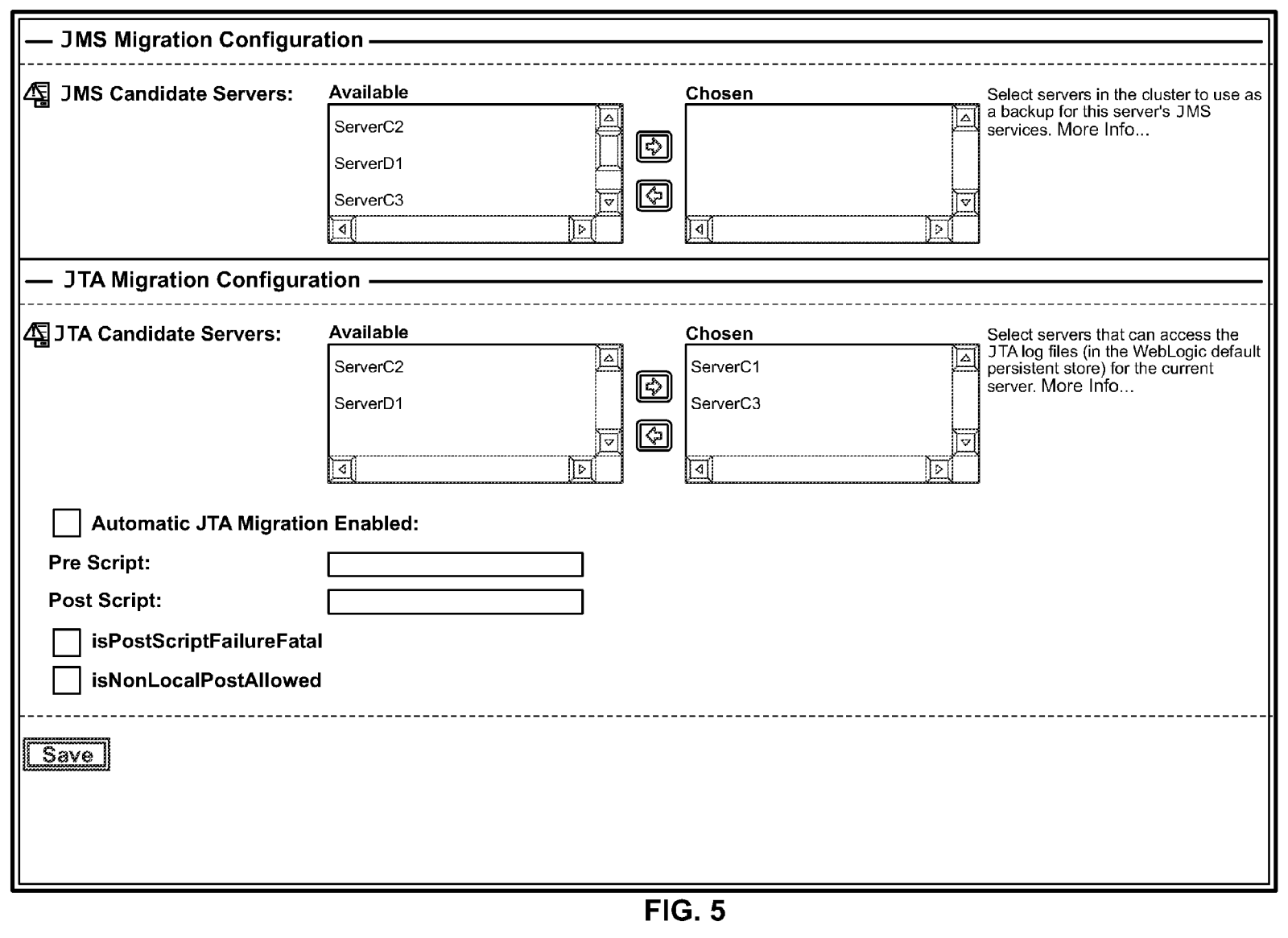

FIGS. 4-5 illustrate pages for embodiments of the present invention.

DETAILED DESCRIPTION

Figure 1:
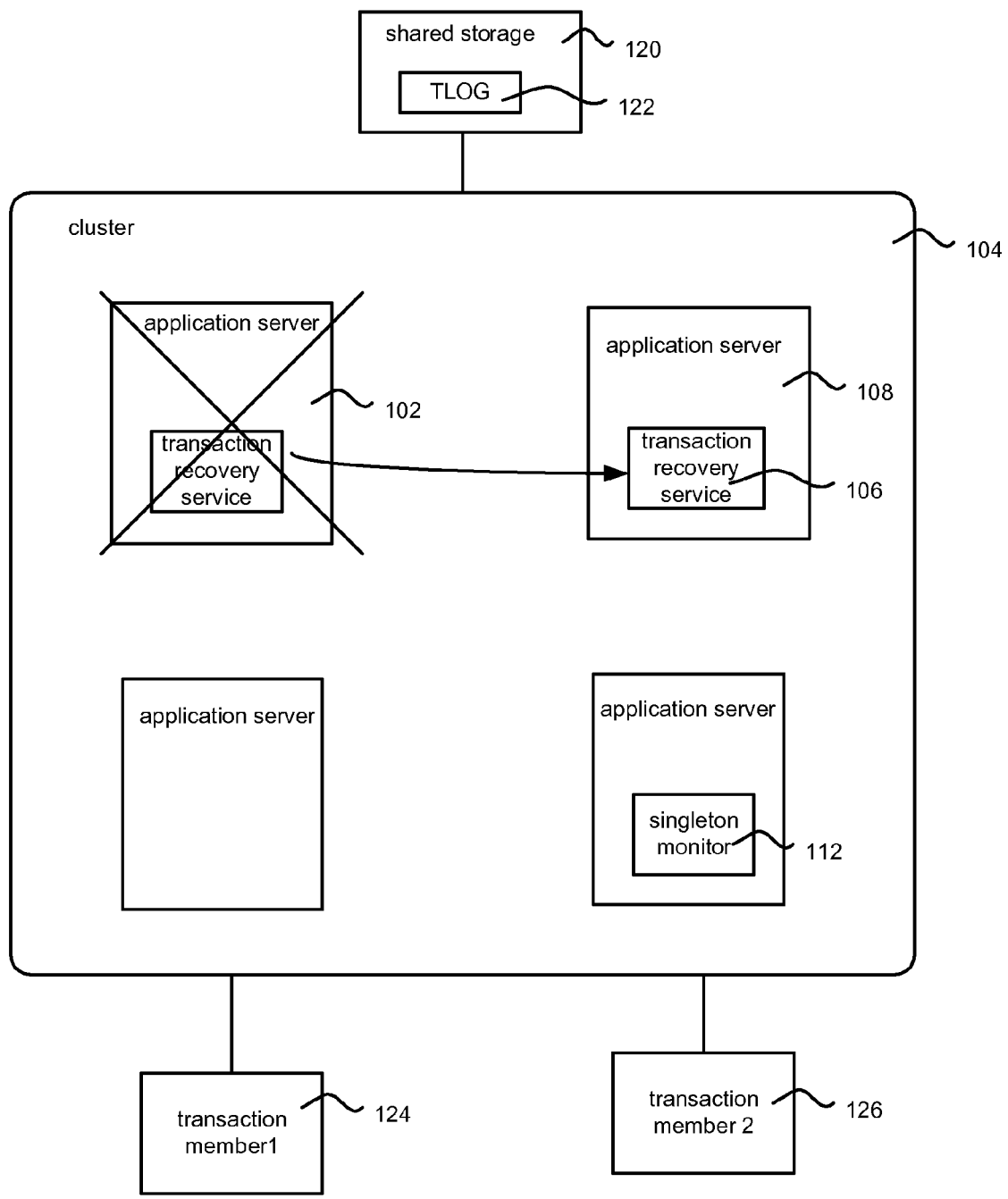
FIG. 1 is an illustration of a system that allows for automatic migration of a transaction recovery service.
Figure 2:
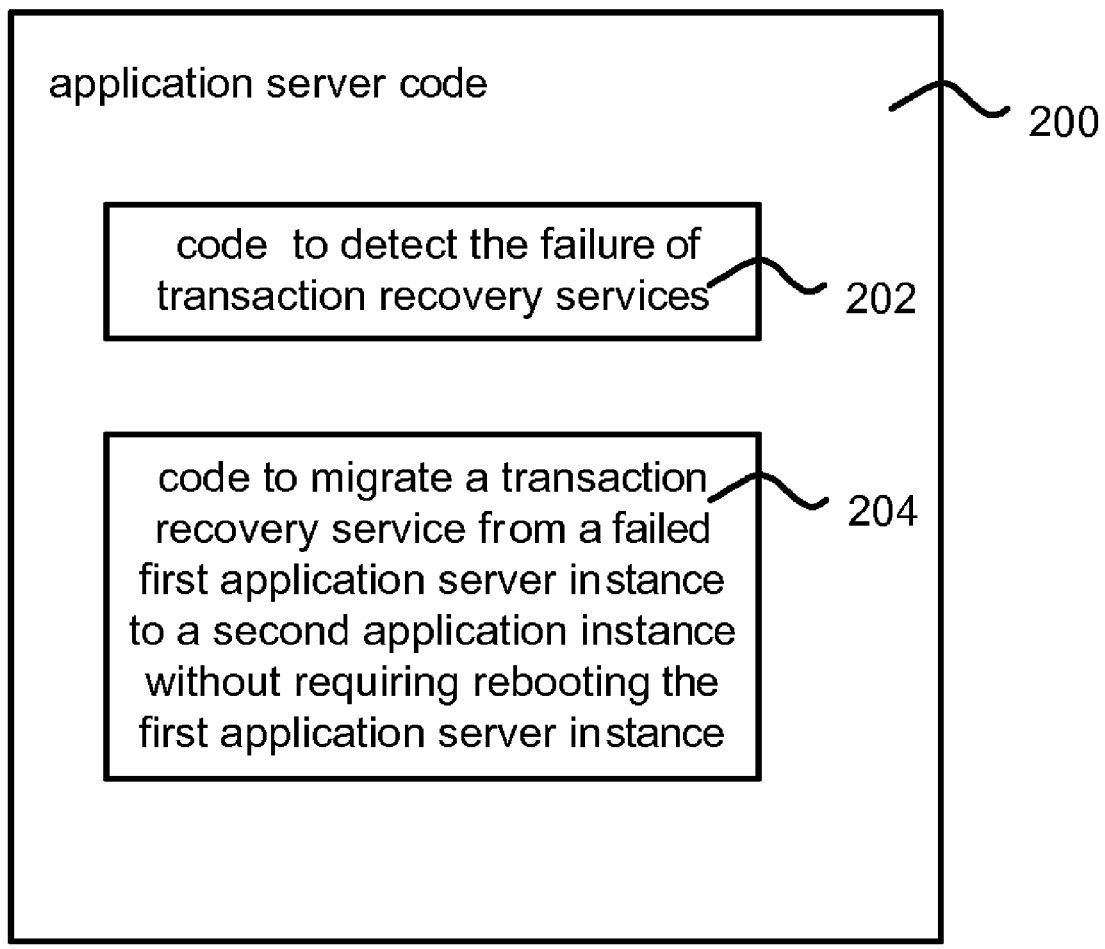
FIG. 2 is an illustration of software for an application server that implements an embodiment of the present invention.

Embodiments of the present invention can include detecting the failure of a first application server instance 102 of a cluster 104. A transaction recovery service 106 can be automatically migrated from the first application server instance 102 to a second application server instance 108 without requiring rebooting the first application server instance 102.

The transaction recovery service 106 can fail back to the first application server instance after the transaction recovery is finished or when the first application server instance reboots.

A Singleton Monitor 112 can detect the failure of the first application server instance 102 and be charge of mitigating the transaction recovery service 106. The transaction recovery service can be Java Transaction API (JTA) service.

The transaction recovery service 106 can be in charge of transactions for application server 102. Shared storage 120 can store information related to the transactions. In one example, a Transaction Log (TLOG) 122 for application server 102 includes the status of in-flight transactions initiated by application server 102. In one embodiment, the TLOG 122 indicates the completed transactions. The transaction recovery service 106 can be used to roll back any uncompleted transactions.

In a transaction, there are typically multiple transaction members, such as transaction members 124 and 126, who each must complete or fail the transaction as a unit. There is typically two phases to a transaction: a prepare phase where transaction members indicate whether they can do their part of the transaction and a commit/rollback phase where the transaction is either committed or rolled back.

The application server code 200 can include code 202 to detect the failure of transaction recovery services; and include code 204 to migrate a transaction recovery service from a failed first application server instance to a second application instance without requiring rebooting the first application server instance.

In one embodiment, when primary server crashes, Singleton Monitor 112 can detect this and automatically migrate the transaction recovery service to backup server. The administrator can also do manually migration. The automatic migration policy can be configured.

An administrator can manually migrate primary server's TRS to another backup server. When recovery is done on back up server, the backup server can initiate failback. When primary server reboots before recovery is done on the backup server, the primary server can initiate failback. An administrator can manually migrate the transaction recovery service back to primary server.

Servers can be shutdown immediately if the health state, such as a JTA health state, becomes FAILED when auto TRA migration policy is running.

Figure 3A:
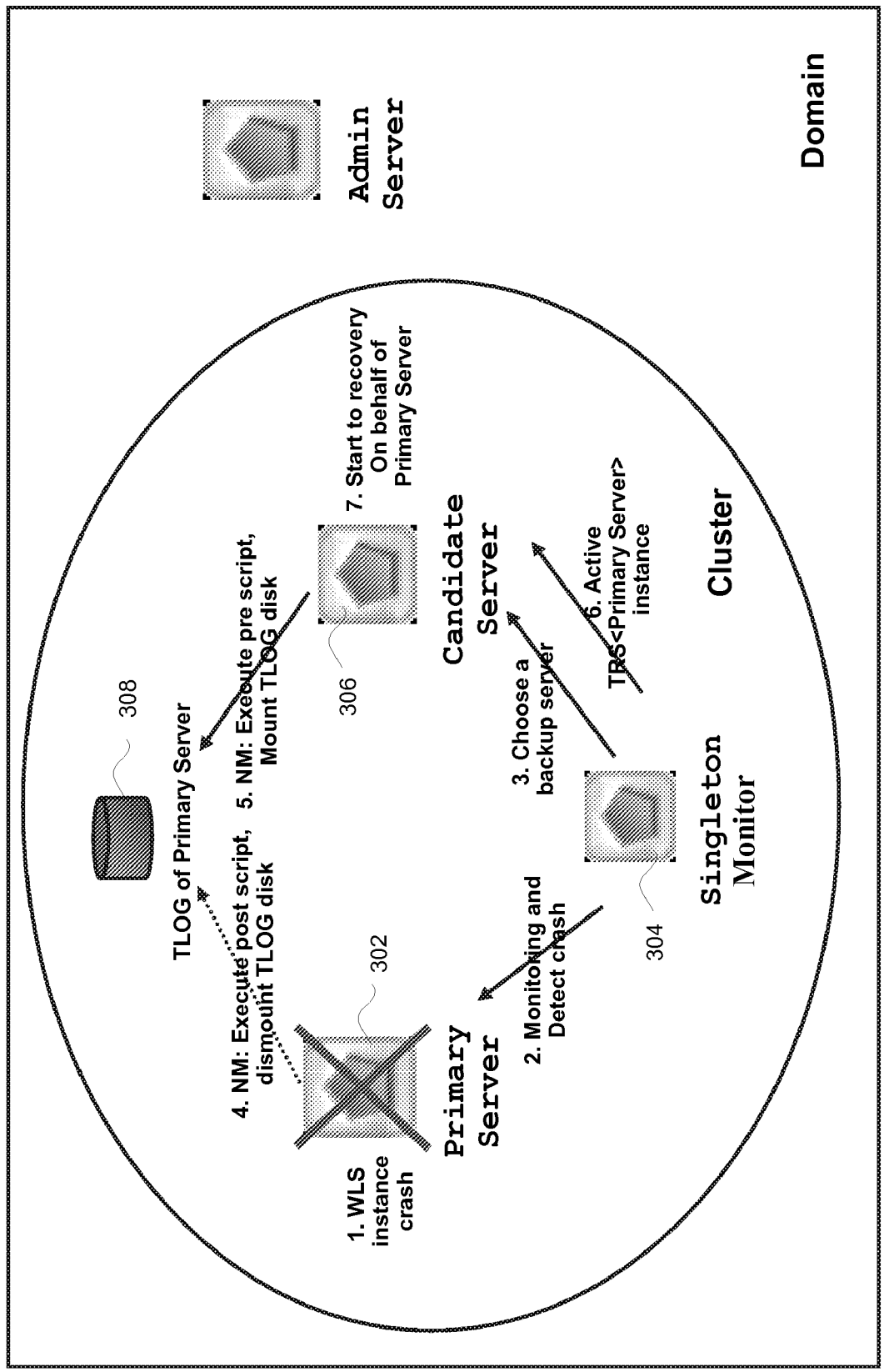
FIGS. 3A-3C illustrates the operation of embodiments of the present invention.

FIG. 3A shows an example of a failure situation. A primary server 302 is crashed. Singleton Monitor 304 can detect the crash by monitoring the transaction recovery service at primary server 302.

The Singleton Monitor 304 can then choose a backup server 306. If possible, the primary server 302 can execute a post-script to dismount the TLOG disk at shared storage 308. Shared storage 308 can be used to store the TLOG.

The backup server 306 can also run a pre-script to mount the TLOG disk. The pre-script and post-script are defined code that run before and after the transfer of the transaction recovery service. The backup server 306 can then start to recover the transaction on behalf of a primary server.

Figure 3B:
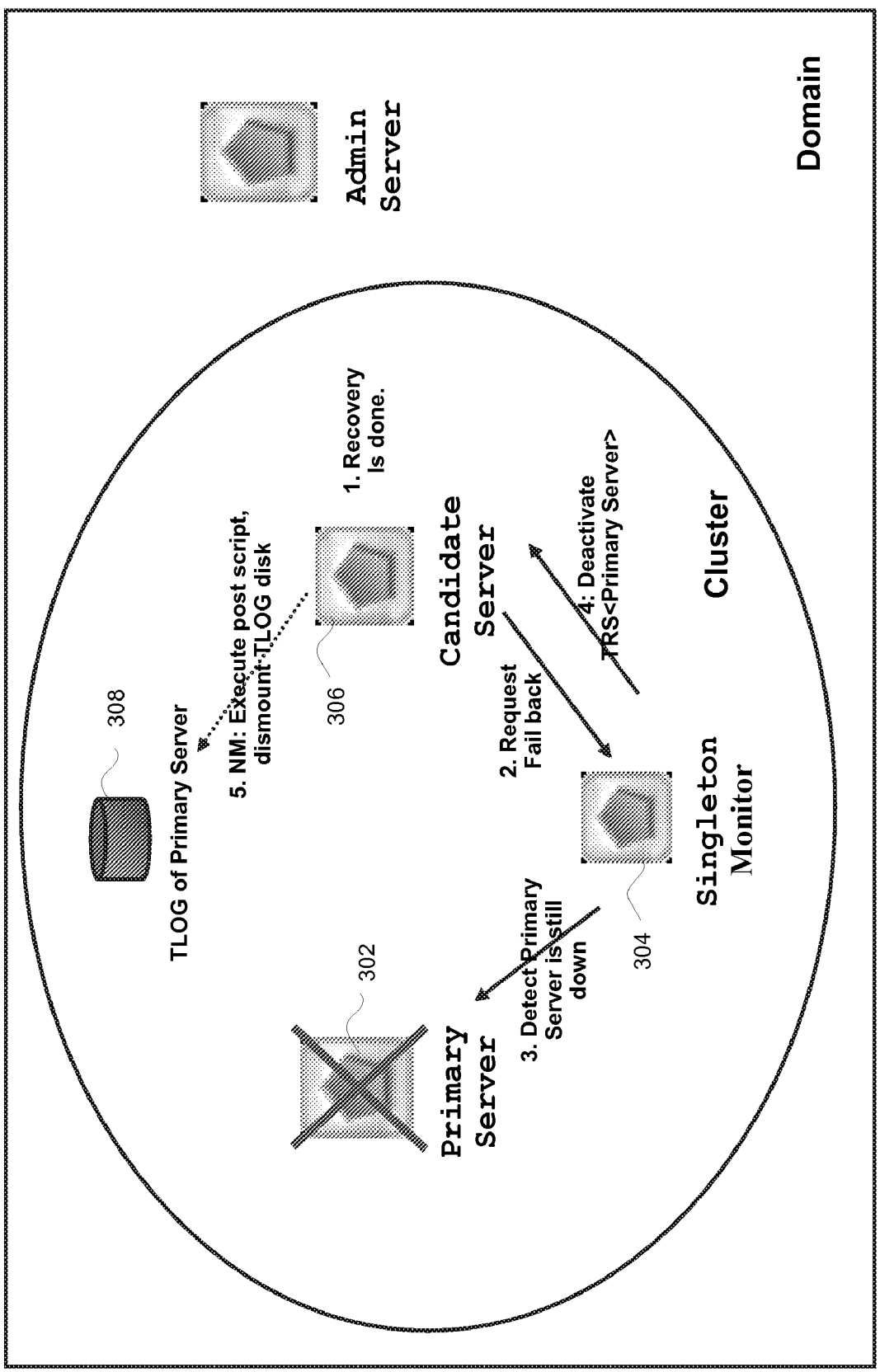

FIG. 3B shows an example where failback is done when the recovery is finished. After the recovery is done for all of the in-flight transactions, the backup sever 306 can request a failback to the Singleton Monitor 304. The Singleton Monitor 304 detects that the primary server 302 is still down. The transaction recovery service is then deactivated and the backup server 306 can run a post-port script to dismount the TLOG.

Figure 3C:
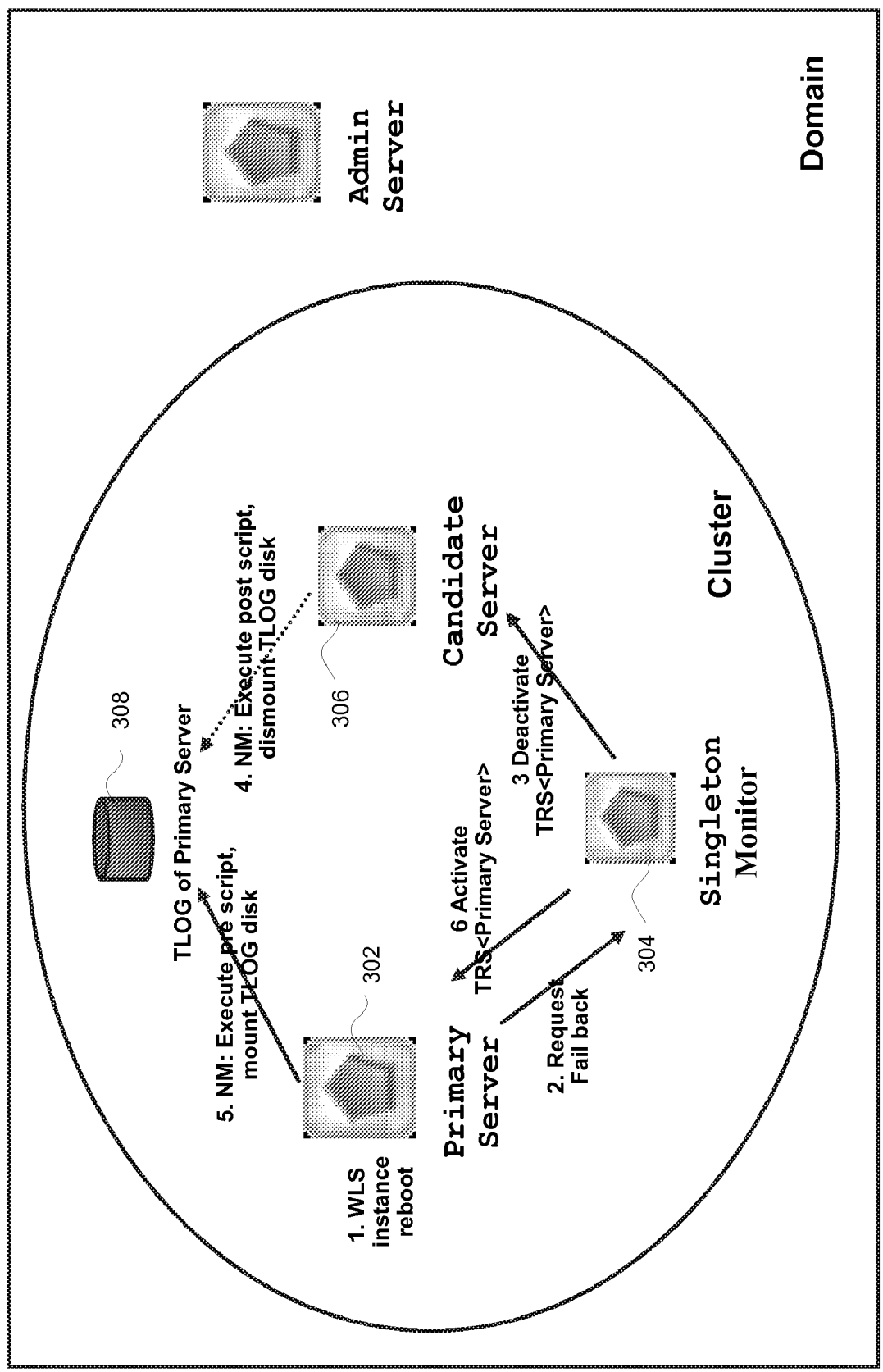
Figure 4:
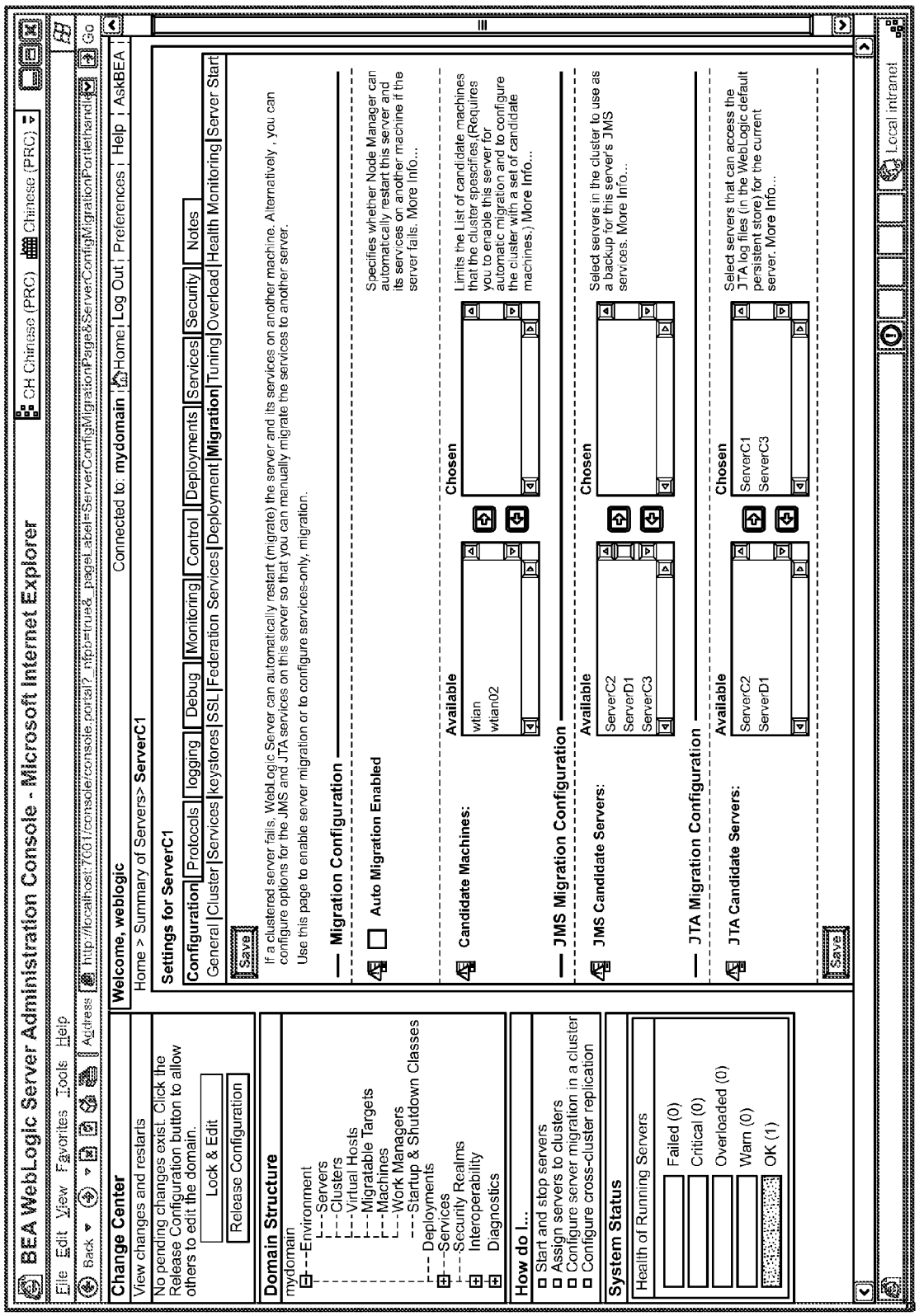

FIG. 3C shows another failback example. In this example, the primary server 302 reboots before all of the in-flight transactions are finished. In one embodiment, since the primary server 302 does not have control of its TLOG, it is unable to do initiate transactions.

The primary server 302 can request a failback. The Singleton Monitor 304 can then tell the backup server 306 to deactivate control of the transaction recovery service for the primary server. The backup server 306 can then run a post-script to dismount the TLOG disk.

The Singleton Monitor 304 can then initiate the transaction recovery service at primary server 302. The primary server 302 can also execute a prescript to mount the TLOG disk.

Past JTA TRS services only support manual migration. When a server within a cluster fails, the administrator can migrate the JTA TRS service to the backup server manually. The new JTA feature "Automatic JTA Migration" can support automatic JTA TRS service migration.

In one embodiment, users can enable JTA automatic migration on one server within cluster. If this server (primary server) fails, JTA TRS service of primary server can be automatically migrated to another server (backup server) in the same cluster.

Both manual JTA migration and automatic JTA migration can potentially be used independently at the same time. For example, if server1 crashes, TRS of server1 gets auto-migrated to server2 (server2 can be selected based on the order of candidate servers list); it is possible for the administrator to manually migrate TRS of server1 from server2 to yet another server.

Each application server can have one TRS running on it, to recover any pending transactions on behalf of it.

JTA primary TLOG can be stored in file system through the default persistent store mechanism.

A user can have the ability to specify whether automatic JTA migration is enabled on a server. In one embodiment, if this configuration is not turned on, then only manual JTA migration is allowed. If this configuration is turned on, then the new migration feature will take place.

This new feature does not require the default store be migratable. It need not change configuration and behavior of current default store. Default store can target to local server.

In one embodiment, the restrictions on automatic/manual JTA migration are:
 1. AdminServer should be available when server startup/failover/failback. In one embodiment, this applies to manual migration only. This is to guarantee the JTA TRS can get exclusive ownership to its TLOG correctly without conflict. When server starts up, JTA TRS can connect to AdminServer to get the latest Information about JTA. When failover/failback occur, JTA TRS can save the latest information to AdminServer. If JTA TRS cannot connect to AdminServer, or any Exception occurred during it's invoke on AdminServer, then server can fail to boot/failover and failback can fail.
    In some special cases, user may want to let the server be able to boot even when AdminServer is not available, and user can ensure that there is no conflict in accessing TLOG, and then user can use a special configuration option to enable this behavior: StrictOwnershipCheck. This option is disabled by default.
    For automatic migration, situation is somewhat different. Since in automatic migration, AdminServer is not be the central control point of migration, it means that AdminServer need not be required when server startup/failover/failback.
 2. Primary server and backup server should be in same domain and same cluster.
    Primary server and backup server should all be of a version that supports this feature.
 3. Default store can be on a shared storage accessible by both primary server and backup server.
    The default store can be put on a shared High Availability (HA) storage, such as SAN, NAS, and dual-ported SCSI etc. So when primary server failed, backup server can access primary server's TLOG file from the shared storage.
    This may need to execute some post-deactivation and pre-activation scripts to perform any unmounting and mounting of the shared storage as needed.
 4. In one embodiment, if scripts are specified, then node manager must be available on all candidate machines
    Scripts can be supported for manual migration also, so this limitation applies to manual migration also.
 5. Backup server need not accept new transaction work on behalf of the original server.
    In one embodiment, the backup server only performs transaction recovery on behalf of the original server. It does not accept new transaction work on behalf of the original server. In this embodiment, new transaction work of the original server can only be serviced after the original server restarts.
 6. Backup server need not process heuristic log files of the original server Note that non-application server WLS log records (e.g. log records written by gateway implementations) in the transaction log files of the original server can be ignored during recovery processing by the backup server.

In one embodiment, the user can configure automatic JTA Migration using console. A user can specify whether automatic JTA migration is enabled for one server through console.

The user can specify a checkbox in console. If the checkbox is checked, then it equals to MigrationPolicy='failure-recovery', and automatic JTA migration can be enabled; If the checkbox is not checked (this is the default configuration), then it equals to MigrationPolicy='none', and automatic JTA migration will be disabled. User can also optionally specify following configurations both for automatic and manual JTA migration:

Pre Script; Post Script; isPostScriptFailureFatal; and isNonLocalPostAllowed. MigrationPolicy can be specified as only one of two possible values: none: automatic JTA migration will be disabled; or failure-recovery: automatic JTA migration will be enabled. There can be validation to enforce this.

The execution of user-defined scripts on the server machine can be a security concern and steps done to mitigate this.

Because JTAMigratableTargetMBean extends MigratableTargetMBean, this feature can be accessed through methods in class MigratableTargetMBean. The methods can include:

```
Strong getMigrationPolicy ( );
void setMigrationPolicy (String policy);
String getPreScript( );
void setPreScript(String filePath);
String getPostScript( );
void setPostScript(String filePath);
boolean isPostScriptFailureFatal( );
void setIsPostScriptFailureFatal (boolean value);
boolean isNonLocalPostAllowed ( );
void setIsNonLocalPostAllowed (boolean value);
```

Beside above methods, several methods are added to JTAMigratableTargetMBean:

```
boolean isStrictOwnershipCheck( );
void setStrictOwnershipCheck(boolean strict);
```

When configuring JTA, the permitted value for policy can be: 'none', 'failure-recovery'. The 'none' means automatic JTA migration is disabled, and this is the default value. The 'failure-recovery' means automatic JTA migration is enabled.

User can configure automatic JTA migration by modifying an application server configuration file "config.xml" directly.

Following is a sample configuration which enables automatic JTA migration and specifies two scripts:

```
<server>
    <name>ServerC1</name>
    <jta-migratable-target>
        <migration-policy>failure-recovery</migration-policy>
        <pre-script>preScirpt.sh</pre-script>
        <post-script>postScirpt.sh</post-script>
    </jta-migratable-target>
</server>
```

If <migration-policy> element is not appeared, then it can mean automatic JTA migration is disabled and only manual JTA migration is allowed.

When the primary server fails, the migratable service framework can automatically migrate the JTA TRS (primary server) service to a backup server. The framework can select a backup server from all candidate servers according to configuration. If a backup server fails before completing the transaction recovery actions, similar automatic migration sequences can also happen to migrate the TRS to another backup server. This can be handled by migration framework and is consistent with other migratable services.

After migration success, if backup server shutdown normally, then when backup server reboot again, the TRS (primary server) can again be activated on backup server.

In one embodiment, there are two cases for fail-back:
1. If the backup server finishes recovering the TLOG transactions before the primary server is restarted, it will initiate an implicit migration of TRS back to the primary server.
   For both manual and automatic migration, post-deactivation script can be executed automatically. This can be supported by migration framework.
2. If the backup server is still recovering the TLOG transactions when the primary server is started, during the TRS initialization of the primary server startup, it can initiate an implicit migration of TRS from the backup server.

For both manual and automatic migration, any post-deactivation and pre-activation scripts can be executed automatically. This can be supported by migration framework.

Embodiments of the present invention can include computer-based methods and systems which may be implemented using conventional general purpose or a specialized digital computer(s) or microprocessor(s), programmed according to the teachings of the present disclosure. Appropriate software coding can readily be prepared by programmers based on the teachings of the present disclosure.

Embodiments of the present invention can include a computer readable medium, such as computer readable storage medium. The computer readable storage medium can have stored instructions which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory or any media or device suitable for storing instructions and/or data. The present invention can include software for controlling both the hardware of a computer, such as general purpose/specialized computer(s) or microprocessor(s), and for enabling them to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer-implemented method for transmitting the code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The forgoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

The invention claimed is:

1. A computer-based method, for use with a system that includes a cluster, of automatically performing a transaction recovery service migration in the cluster, comprising the steps of:
   providing a cluster which includes a plurality of application servers, including a primary server and one or more backup servers;
   providing, initially at the primary server, a transaction recovery service which logs transactions to a transaction log repository, and which recovers transactions on behalf of the primary server;
determining a configuration information which specifies an automatic migration policy for use with the transaction recovery service;
monitoring, using a singleton monitor, the presence of the transaction recovery service within the cluster;
detecting, by the singleton monitor, a failure of the primary server; and
automatically migrating the transaction recovery service from the primary server to a selected backup server, without requiring rebooting the primary server, and according to the automatic migration policy, including
running any specified post-script at the primary server to prepare for migration, including dismounting the transaction log repository if specified,
running any specified pre-script at the selected backup server to prepare for migration, including mounting the transaction log repository if specified, and
starting the transaction recovery service on the selected backup server, including accessing the transaction log repository to recover any in-flight transactions.

2. The computer-based method of claim 1, wherein the transaction recovery service provides the Java Transaction API (JTA) within the cluster.

3. The computer-based method of claim 1, wherein the migrated transaction recovery service includes in-flight transactions.

4. The computer-based method of claim 1, wherein the transaction recovery service fails back to the primary server after the transaction recovery is finished, including wherein
the backup server requests a failback from the singleton monitor,
the singleton monitor detects whether the primary server is still down, and
if the primary server is no longer down, the transaction recovery service is deactivated at the backup server and migrated back to the primary server.

5. The computer-based method of claim 1, wherein the transaction recovery service fails back to the primary server when the primary server reboots, including wherein
the primary server requests a failback from the singleton monitor, and
the singleton monitor instructs the backup server to deactivate the transaction recovery service, and migrates the transaction recovery service back to the primary server.

6. The computer-based method of claim 5, wherein the transaction recovery service fails back to the primary server when the primary server reboots, including wherein
the primary server requests a failback from the singleton monitor, and
the singleton monitor instructs the backup server to deactivate the transaction recovery service, and migrates the transaction recovery service back to the primary server.

7. The computer-based method of claim 1, wherein each of the plurality of application servers have a transaction recovery service running thereon which recovers pending transactions on behalf of that application server.

8. The computer-based method of claim 1, wherein the transaction log repository is stored in a file system using a default persistent store mechanism.

9. The computer-based method of claim 1, further comprising allowing a user to specify configuration options, including whether automatic migration of the transaction recovery service is enabled or not enabled for a particular application server.

10. A computer readable medium includes instructions stored therein which when read and executed by one or more computers cause the computers to perform the steps comprising:
provide a cluster which includes a plurality of application servers, including a primary server and one or more backup servers;
provide, initially at the primary server, a transaction recovery service which logs transactions to a transaction log repository, and which recovers transactions on behalf of the primary server;
determine a configuration information which specifies an automatic migration policy for use with the transaction recovery service;
monitor, using a singleton monitor, the presence of the transaction recovery service within the cluster;
detect, by the singleton monitor, a failure of the primary server; and
automatically migrate the transaction recovery service from the primary server to a selected backup server, without requiring rebooting the primary server, and according to the automatic migration policy, including
run any specified post-script at the primary server to prepare for migration, including dismounting the transaction log repository if specified,
run any specified pre-script at the selected backup server to prepare for migration, including mounting the transaction log repository if specified, and
start the transaction recovery service on the selected backup server, including accessing the transaction log repository to recover any in-flight transactions.

11. The computer-based method of claim 10, wherein the transaction recovery service provides the Java Transaction API (JTA) within the cluster.

12. The computer-based method of claim 10, wherein the migrated transaction recovery service includes in-flight transactions.

13. The computer-based method of claim 10, wherein the transaction recovery service fails back to the primary server after the transaction recovery is finished, including wherein
the backup server requests a failback from the singleton monitor,
the singleton monitor detects whether the primary server is still down, and
if the primary server is no longer down, the transaction recovery service is deactivated at the backup server and migrated back to the primary server.

14. The computer readable medium of claim 10, wherein each of the plurality of application servers have a transaction recovery service running thereon which recovers pending transactions on behalf of that application server.

15. The computer readable medium of claim 10, wherein the transaction log repository is stored in a file system using a default persistent store mechanism.

16. The computer readable medium of claim 10, further comprising instructions for allowing a user to specify configuration options, including whether automatic migration of the transaction recovery service is enabled or not enabled for a particular application server.

17. A system for automatically performing a transaction recovery service migration in a cluster, comprising:
a cluster which includes a plurality of application servers, including a primary server and one or more backup servers;
a transaction recovery service, executing initially at the primary server, which logs transactions to a transaction log repository, and which recovers transactions on behalf of the primary server;

a configuration information which specifies an automatic migration policy for use with the transaction recovery service;

a singleton monitor, which monitors the presence of the transaction recovery service within the cluster, and detects failures of the primary server; and wherein upon detecting a failure of the primary server, the system automatically migrates the transaction recovery service from the primary server to a selected backup server, according to the automatic migration policy and without requiring rebooting the primary server, including running any specified post-script at the primary server to prepare for migration, including dismounting the transaction log repository if specified, running any specified pre-script at the selected backup server to prepare for migration, including mounting the transaction log repository if specified, and starting the transaction recovery service on the selected backup server, including accessing the transaction log repository to recover any in-flight transactions.

18. The system of claim 17, wherein the transaction recovery service provides the Java Transaction API (JTA) within the cluster.

19. The system of claim 17, wherein the migrated transaction recovery service includes in-flight transactions.

20. The system of claim 17, wherein the transaction recovery service fails back to the primary server after the transaction recovery is finished, including wherein the backup server requests a failback from the singleton monitor, the singleton monitor detects whether the primary server is still down, and if the primary server is no longer down, the transaction recovery service is deactivated at the backup server and migrated back to the primary server.

21. The system of claim 17, wherein the transaction recovery service fails back to the primary server when the primary server reboots, including wherein the primary server requests a failback from the singleton monitor, and the singleton monitor instructs the backup server to deactivate the transaction recovery service, and migrates the transaction recovery service back to the primary server.

22. The system of claim 17, wherein each of the plurality of application servers have a transaction recovery service running thereon which recovers pending transactions on behalf of that application server.

23. The system of claim 17, wherein the transaction log repository is stored in a file system using a default persistent store mechanism.

24. The system of claim 17, further comprising a configuration information that allows a user to specify configuration options, including whether automatic migration of the transaction recovery service is enabled or not enabled for a particular application server.

* * * * *